US006903773B1

(12) United States Patent
Fushimoto

(10) Patent No.: US 6,903,773 B1
(45) Date of Patent: Jun. 7, 2005

(54) IMAGE TAKING METHOD AND APPARATUS FOR LINKING IMAGES

(75) Inventor: Hideo Fushimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/210,721

(22) Filed: Dec. 14, 1998

(30) Foreign Application Priority Data

Dec. 25, 1997 (JP) .............................................. 9-358606

(51) Int. Cl.[7] .......................................... H04N 5/222
(52) U.S. Cl. ............................ 348/333.02; 348/333.12
(58) Field of Search ....................... 348/333.12, 333.05, 348/333.06, 333.03, 333.02

(56) References Cited

U.S. PATENT DOCUMENTS

| 5,142,662 A | * | 8/1992 | Gump et al. ............. 715/501.1 |
| 5,155,774 A | * | 10/1992 | Numagami ................. 382/113 |
| 5,216,596 A | * | 6/1993 | Weinstein .................... 348/79 |
| 5,471,392 A | * | 11/1995 | Yamashita .................. 701/200 |
| 5,488,558 A | * | 1/1996 | Ohki ......................... 701/207 |
| 5,592,599 A | * | 1/1997 | Lindholm ................... 345/427 |
| 5,633,678 A |   | 5/1997 | Parulski et al. |
| 5,768,447 A | * | 6/1998 | Irani et al. .................. 382/305 |
| 5,870,741 A | * | 2/1999 | Kawabe et al. ................ 707/5 |
| 5,902,347 A | * | 5/1999 | Backman et al. ........... 701/200 |
| 6,018,697 A | * | 1/2000 | Morimoto et al. .......... 701/209 |
| 6,111,662 A | * | 8/2000 | Satoh et al. ................ 358/442 |
| 6,282,362 B1 | * | 8/2001 | Murphy et al. ............... 386/46 |
| 6,333,748 B1 |   | 12/2001 | Takiguchi et al. |
| 2002/0001032 A1 | * | 1/2002 | Ohki ......................... 348/207 |

FOREIGN PATENT DOCUMENTS

| JP | 7-210580 | 8/1995 |
| JP | 7-320457 | 12/1995 |
| JP | 8-30763 | 2/1996 |
| JP | 10-143640 | 5/1998 |
| WO | WO 97/26757 | 7/1997 |

* cited by examiner

*Primary Examiner*—Andrew Christensen
*Assistant Examiner*—Brian Genco
(74) *Attorney, Agent, or Firm*—Fitzpatrick, Cella, Harper & Scinto

(57) ABSTRACT

An image pickup apparatus has the capability of easily linking a stored image to another stored image. When an image is taken, link information indicating the linking relationship between the taken image and data to which the taken image is linked is generated. Also provided is a method of controlling such an image pickup apparatus and a storage medium storing a program according to which the image pickup apparatus is controlled.

19 Claims, 16 Drawing Sheets

PRESS THE SHUTTER BUTTON

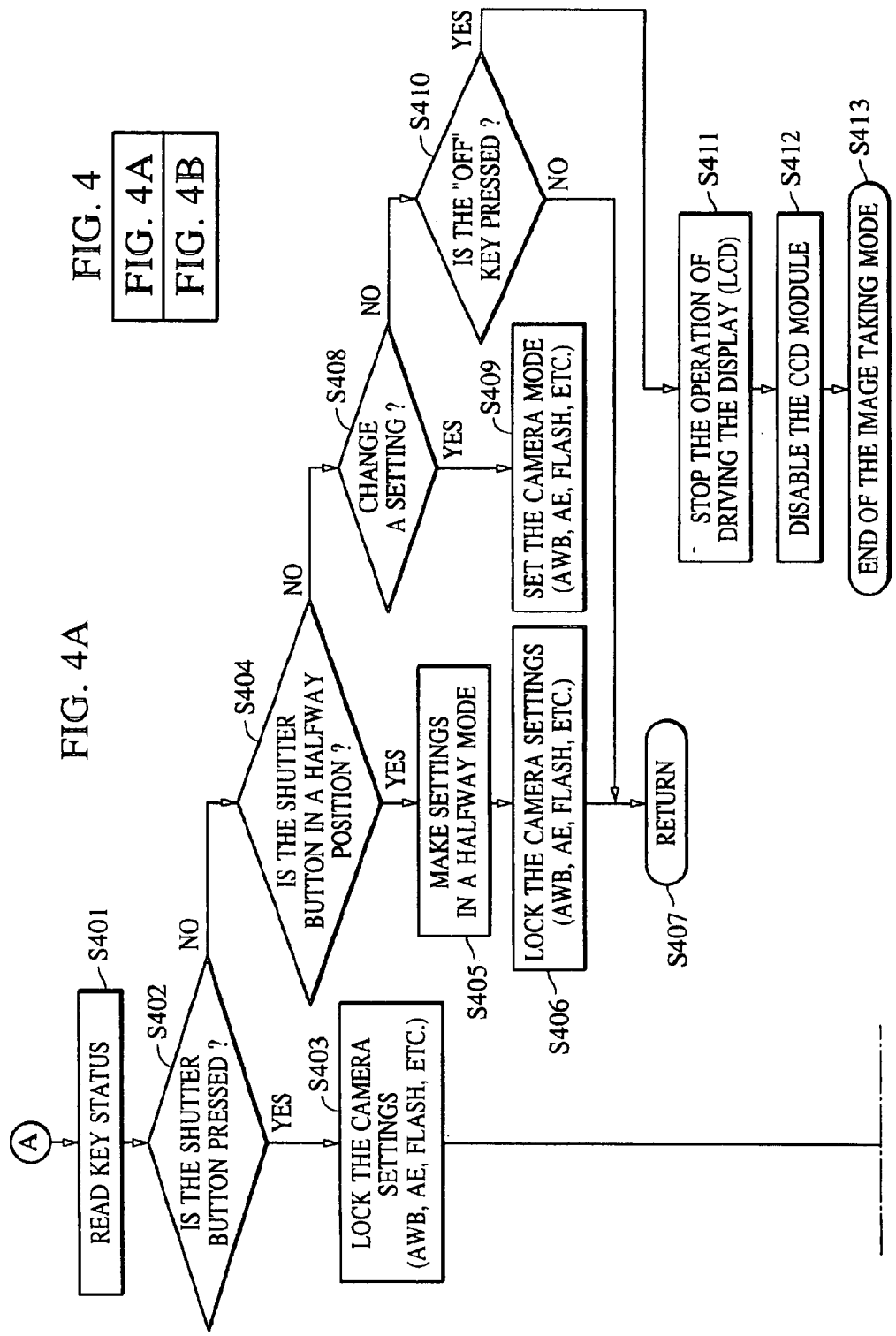

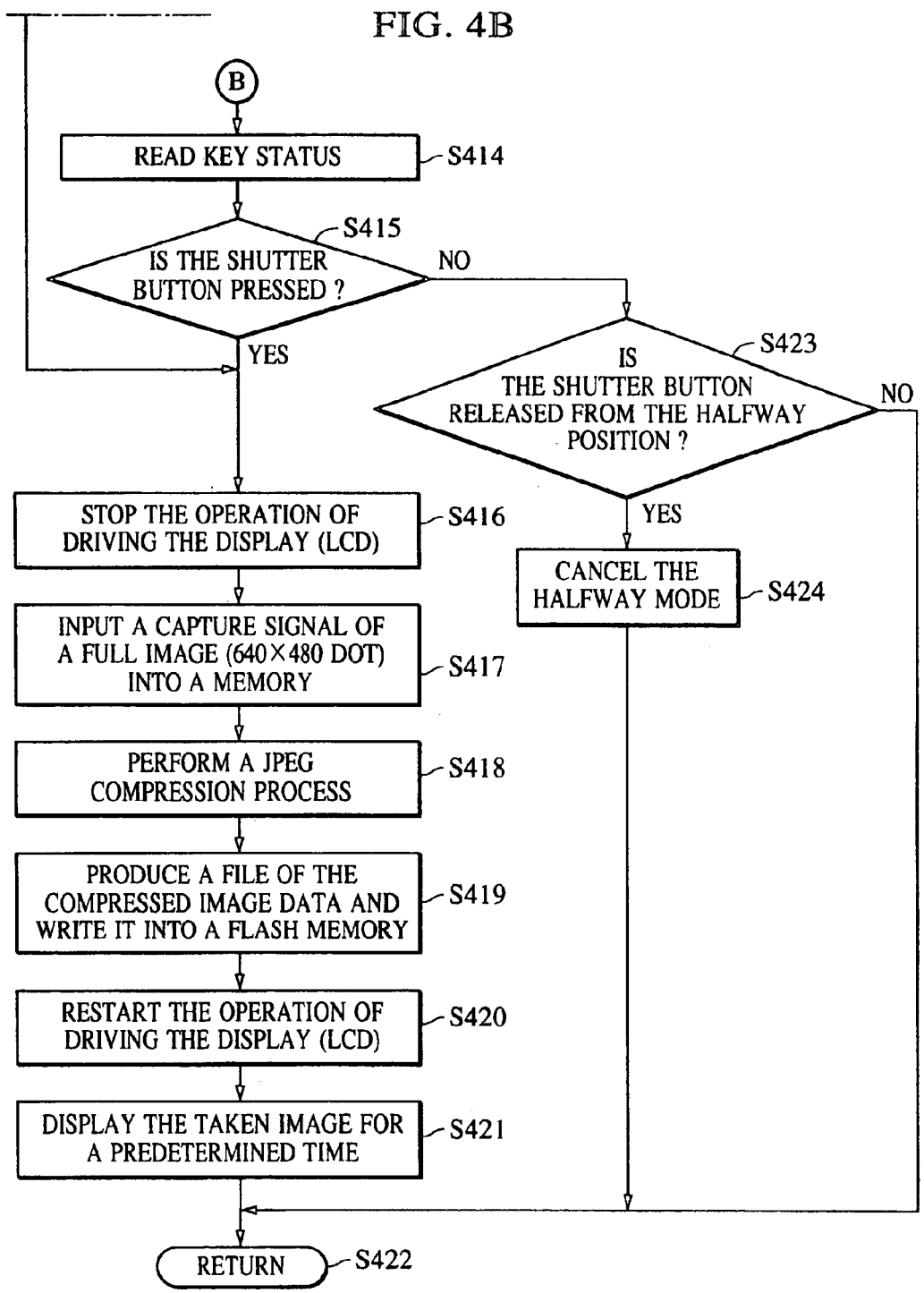

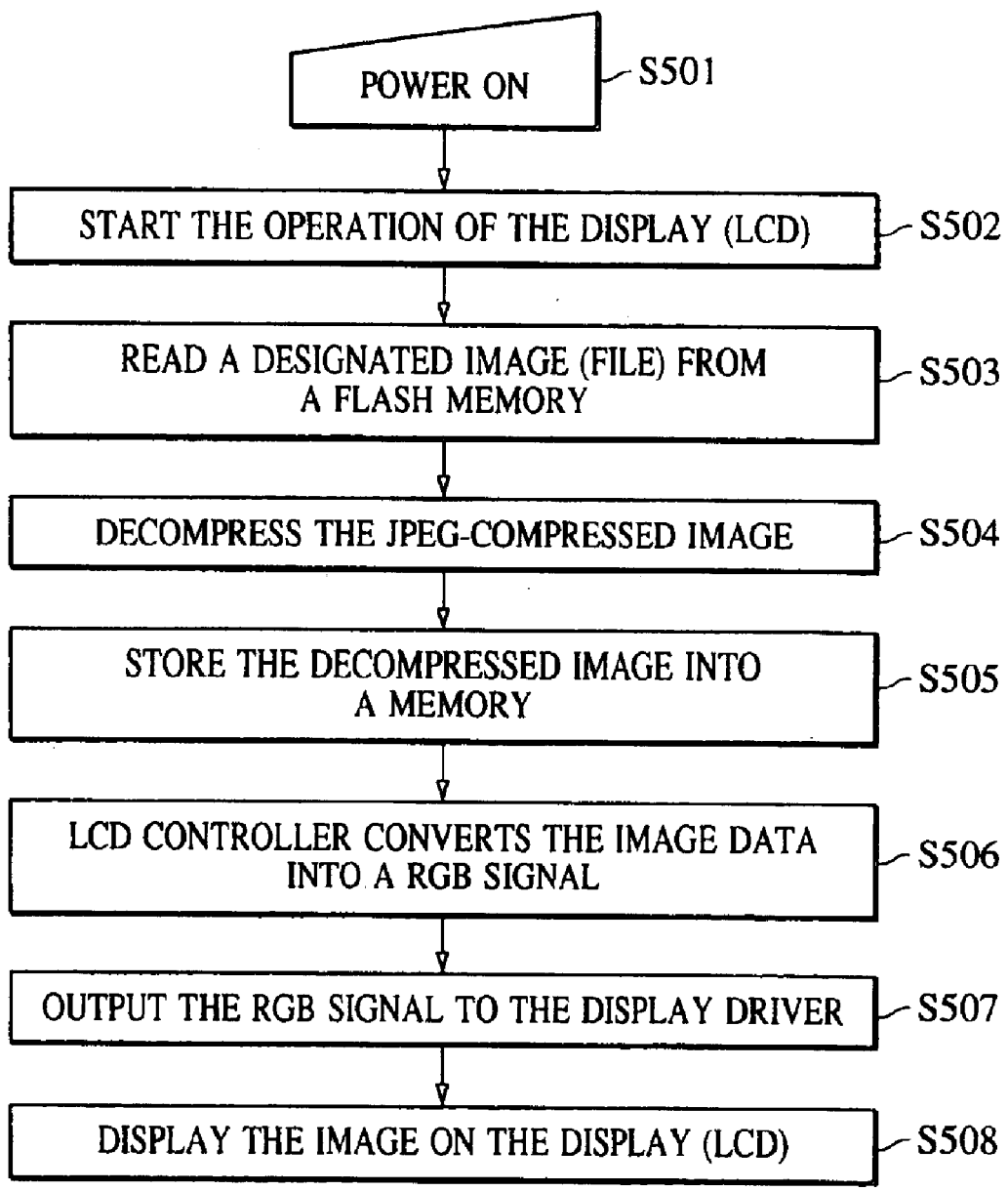

PRESS THE SHUTTER BUTTON

SUCCESSFULLY LINKED

FIG. 12A
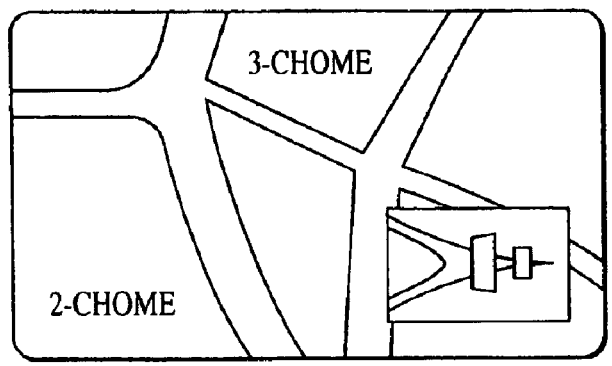
FIG. 12B
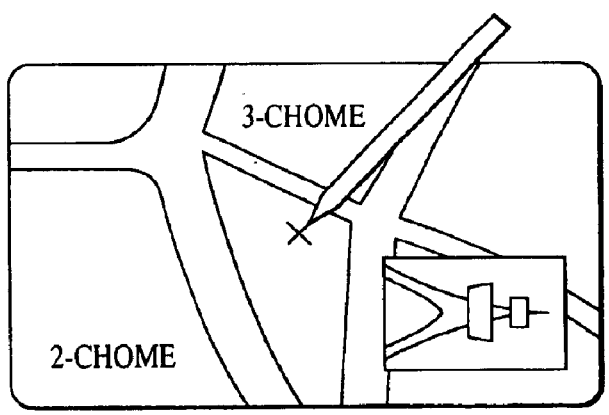
PRESS THE SHUTTER BUTTON
FIG. 12C
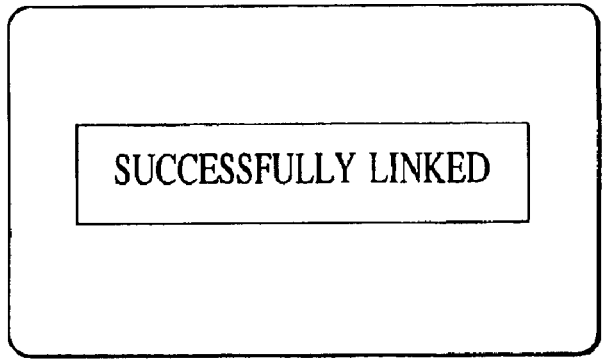
SUCCESSFULLY LINKED

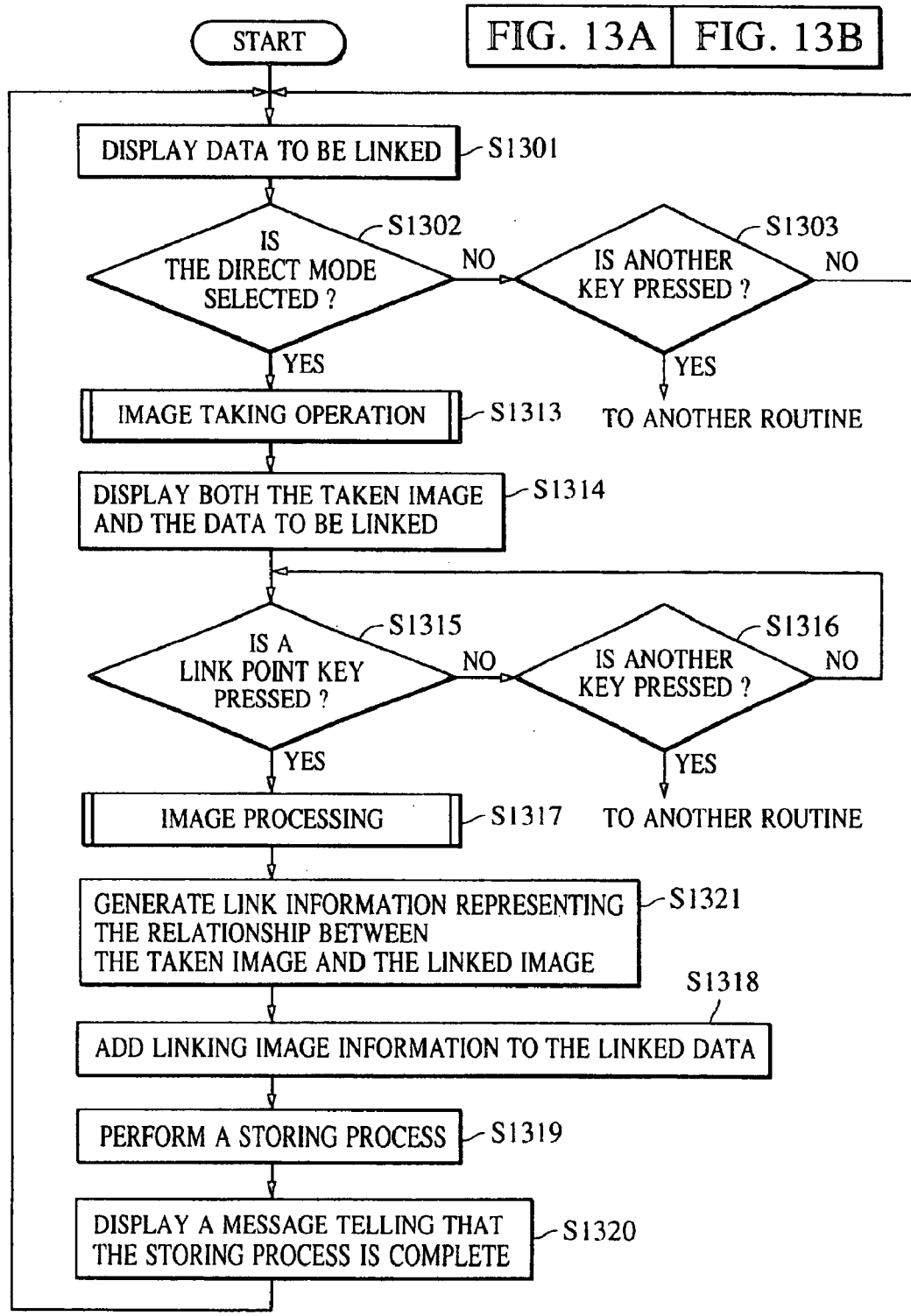

IMAGE TAKING METHOD AND APPARATUS FOR LINKING IMAGES

BACKGROUND OF THE INVENTION

1. Field of the Invention

The present invention relates to an image pickup apparatus suitable for use, for example, with a storage medium capable of storing a plurality of images, a method of controlling such an image pickup apparatus, and a storage medium.

2. Description of the Related Art

With advances in digital technology in recent years, a great number of image pickup apparatus having a digital recording capability (generally called digital cameras) have been proposed. Some of these digital cameras include (i) a viewfinder or a small-sized display device such as a TFT liquid crystal display device for displaying an image during or after an image taking operation, and (ii) a mass storage device such as a flash memory for storing a taken image, disposed in the main body of the digital camera.

In this technical field, it is desired that the digital camera have an editing capability whereby a plurality of taken images may be stored in such a manner that they are linked to each other. To store a plurality of taken images in a conventional digital camera, it is required to read images one by one from a storage area provided in the main body of the digital camera and perform an operation of establishing a link for each image. However, such an operation is very complex and troublesome for a user. Furthermore, because an image to be linked is selected, for example, by its file name there is a possibility that an undesired image is linked by mistake.

It is a general object of the present invention to solve the above problem. More specifically, it is an object of the present invention to provide an image pickup apparatus capable of easily linking a taken image to another image, a method of controlling an image pickup apparatus, and a storage medium.

SUMMARY OF THE INVENTION

According to an aspect of the present invention, to achieve the above objects, there is provided an image pickup apparatus comprising: image sensing means; storage means for storing predetermined data; display means for displaying the predetermined data stored in the storage means; designation means for designating an arbitrary point on the predetermined data displayed on the display means; and generation means for generating link information in such a manner that if an image is taken by the image sensing means after a point is designated by the designation means, link information indicating that the taken image is linked to the designated point is generated.

According to another aspect of the present invention, there is provided a method of controlling an image pickup apparatus, comprising: an image sensing step; a displaying step for displaying predetermined data stored in a storage unit; a designation step for designating an arbitrary point on the predetermined data displayed in the displaying step; and a generation step for generating link information in such a manner that if an image is taken in the image sensing step after a point is designated in the designation step, link information indicating that the taken image is linked to the designated point is generated.

These and other objects and features of the present invention will become more apparent from the following detailed description of preferred embodiments as illustrated in the accompanying drawings.

BRIEF DESCRIPTION OF THE DRAWINGS

FIG. 4 is a flowchart illustrating a process performed in the digital camera to take an image;

FIG. 5 is a flowchart illustrating a process performed in the digital camera to reproduce an image;

FIG. 12 is a schematic diagram illustrating a process of establishing links among images taken by a digital camera according to another embodiment of the present invention;

DESCRIPTION OF THE PREFERRED EMBODIMENTS

Figure 1:
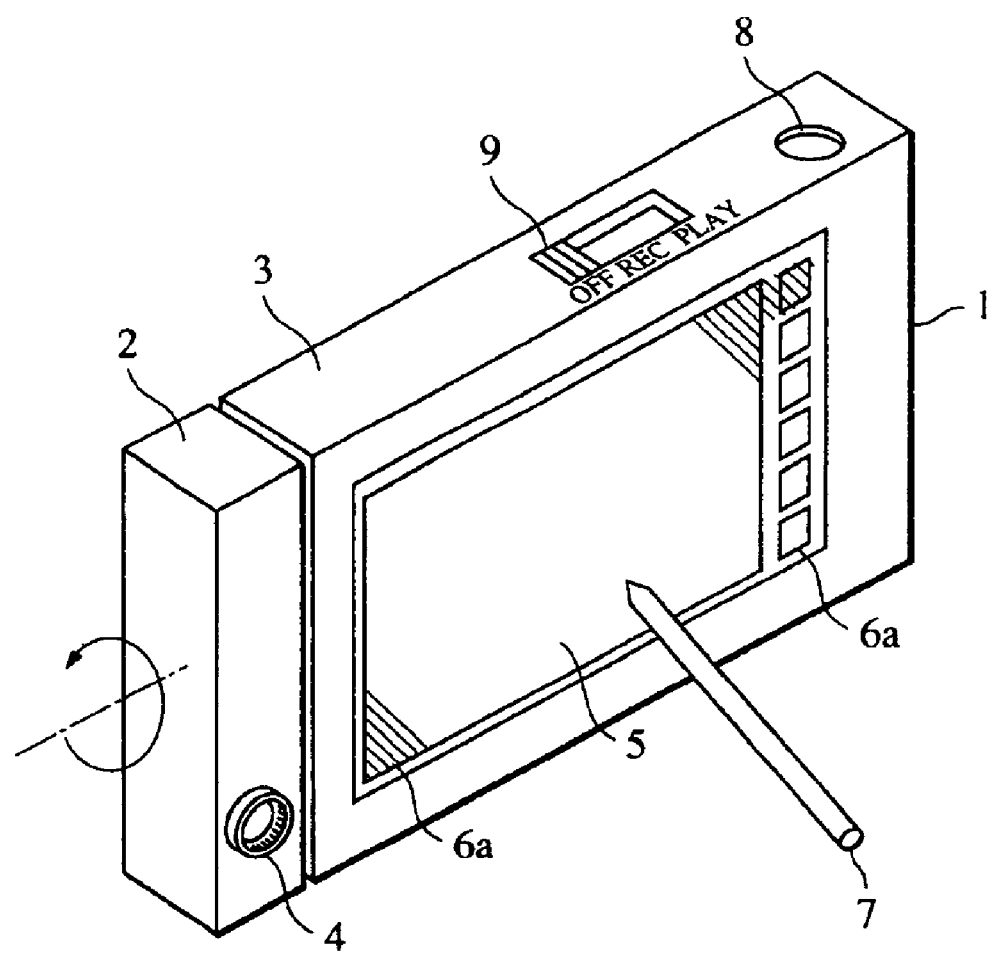
FIG. 1 is a schematic diagram illustrating the external appearance of a digital camera.

FIG. 1 illustrates an example of the external appearance of a digital camera 1 which is an embodiment of an image pickup apparatus according to the present invention. The digital camera 1 includes a camera module 2 and a main body 3. The camera module 2 includes a lens 4 and an image sensing device such as a CCD. The camera module 2 is attached to the main body 3 so that the camera module 2 can rotate with respect to the main body 3. This allows a user to take a picture of himself/herself while monitoring the image.

The main body 3 includes a display unit 5 realized using, for example, a TFT color liquid crystal display technique, for monitoring the image during the operation of taking an image and for displaying an image after the image taking operation. There is provided a tablet 6 of the pressure-sensitive type or the like on the display unit 5 so that the user can input a control command for controlling the digital camera 1 or other information by touching the tablet 6 with a pen 7. A mode key 6a is provided on a side of the display unit 5 whereby the user can switch the application or the operation mode. Reference numeral 8 denotes a shutter button. Reference numeral 9 denotes a selection switch for selecting an operation mode between an image taking mode and a reproducing mode wherein the switch 9 also acts as a power switch.

To take an image of a subject, the digital camera 1 is set so that the lens 4 is aimed at the subject, and the composition is determined while monitoring the image displayed on the display unit 5. If the shutter button 8 is pressed after determining the composition, the image is stored in the data storage unit of the digital camera 1. To reproduce a taken image, the selection switch 9 is set into a reproducing mode (PLAY), and the mode key 6a and the pen 7 are operated so that a desired image is displayed on the display unit 5.

The operation performed in the digital camera 1 to take an image is described below.

Figure 2:
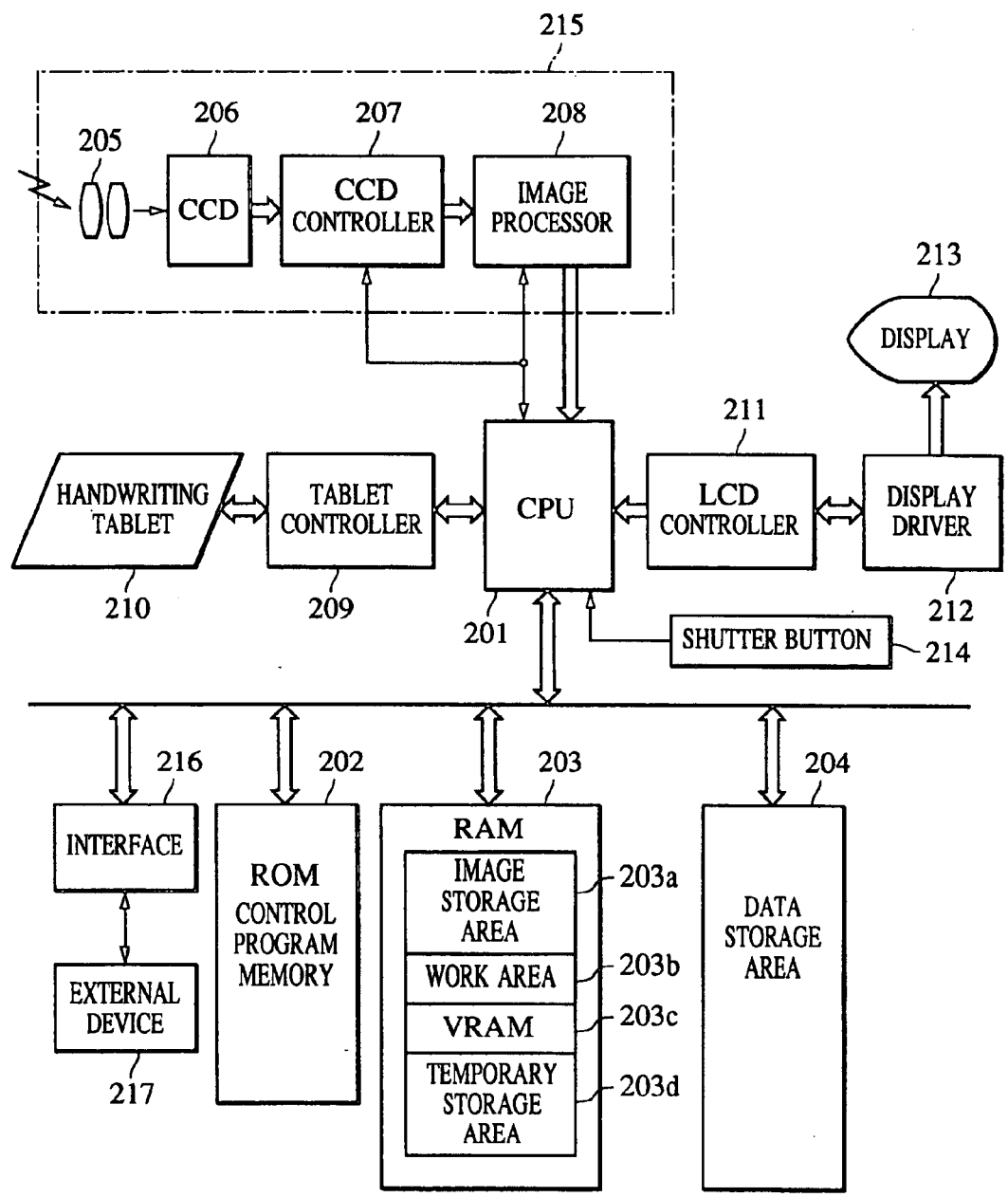
FIG. 2 is a block diagram illustrating an example of the construction of a digital camera.

FIG. 2 is block diagram illustrating an example of the construction of the digital camera 1.

In FIG. 2, reference numeral 201 denotes a CPU which controls the operation of the digital camera 1. The CPU 201 is connected to a RAM 202, a RAM 203, a data storage unit 204, an image processor 208, a tablet controller 209, an LCD controller 211, and a shutter button 214. The image processor 208 is connected to a CCD controller 207 and a CCD 206. The tablet controller 209 is connected to a handwriting tablet 210, and the LCD controller 211 is connected to a display driver 212 and further to a display unit 213.

The CPU 201 controls the operation over the entire digital camera 1 in accordance with the control program stored in the ROM 202. The operations controlled by the CPU 201 includes a process of reading image data output by the image processor 208 and transferring it to the RAM 203, a process of transferring data from the RAM 203 to the LCD controller 211, a process of compressing image data according to the JPEG (Joint Photographic Expert Group) standard and storing the resultant image data file into the data storage unit 204, processes of executing various application programs in accordance with information input via the handwriting tablet 210, and a process of starting an image taking operation in response to the operation of the shutter button 214.

The RAM 203 includes an image storage area 203a, a work area 203b, a VRAM 203c, and a temporarily saving area 203d. The image storage area 203a is used as a temporary buffer for temporarily storing image data (YUV digital signal) output from the image processor 208 or JPEG-compressed image data read from the data storage unit 204. The image storage area 203a is also used as a work area during image compression and decompression processes. The work area 203b is a work area used by various application programs. The VRAM 203c is a VRAM for storing image data to be displayed on the display unit 213. The temporary saving area 203d is a work area used to temporarily save various data.

The data storage unit 204 is a memory for storing, into the form of a file, image data compressed by the CPU 201 according to the JPEG standard and also various associated data used by various application programs for the purpose of reference. This memory is preferably a nonvolatile memory such as a flash memory. The data storage unit 204 is detachable and thus it is possible to transfer data stored in a storage device of an external device to the digital camera 1 via the detachable data storage unit 204.

A lens set 205 includes a plurality of lenses for optically projecting an image of a subject onto the CCD 206. The CCD (photoelectric conversion element) 206 is a device for converting the image projected via the lens set 205 into an analog electric signal. The CCD controller 207 includes a timing generator for supplying a transfer clock signal and a shutter signal to the CCD 206, a circuit for removing noise from the signal output by the CCD and for controlling the gain, and an A/D converter for converting the analog signal into a 10-bit digital signal.

The image processor 208 performs image processing, such as gamma conversion, color space conversion, white balance correction, AE, and flash correction, on the 10-bit digital signal output from the CCD controller 207. The resultant signal is output as an 8-bit digital signal in the YUV (4: 2: 2) format. Herein, the assembly of the lens set 205, the CCD 206, the CCD controller 207, and the image processor 208 is referred to as a camera module 215.

The tablet controller 209 controls the operation of driving the handwriting tablet 210 and also controls the operation of converting a control command input by a user or other information into a digital signal and transferring it to the CPU 201. The LCD controller 211 receives YUV digital image data transferred from the image processor 208 or YUV image data produced by JPEG-decompressing an image file stored in the data storage unit, and converts it into an RGB digital signal. The resultant RGB digital signal is output to the display driver 212.

The display driver 212 drives the display unit 213. The display unit 213 (5 in FIG. 1) serves to display an image and includes for example a TFT liquid crystal display device according to the VGA (640 dots×480 dots) standard. A shutter button 214 (8 in FIG. 1) is a switch used to start an image taking operation. This shutter button 214 can be in either of two switching positions depending on the pressure applied to the shutter button. If it is detected that the shutter button 214 is in the first position (hereinafter referred to as a "half-pressed position"), camera settings associated with white balance, AE, and the like are locked. When the shutter button 214 is pressed to the second position (hereinafter referred to as a "full-pressed position"), an image signal is captured.

The employment of the half-pressed position makes it possible for a user to check the quality and other features of an image before the image is actually taken, by monitoring the image which is displayed on the display unit 5 after being subjected to various processes such as a white balance correction.

The interface 216 serves as an interface in data transmission between the digital camera 1 and an external device such as a personal computer. The external device 217 is for example a personal computer or a server connected to the digital camera via a network.

Referring to flowcharts shown in FIGS. 3, 4, and 5, the operation of the digital camera 1 for taking an image in accordance with a first embodiment is described below.

Figure 3:
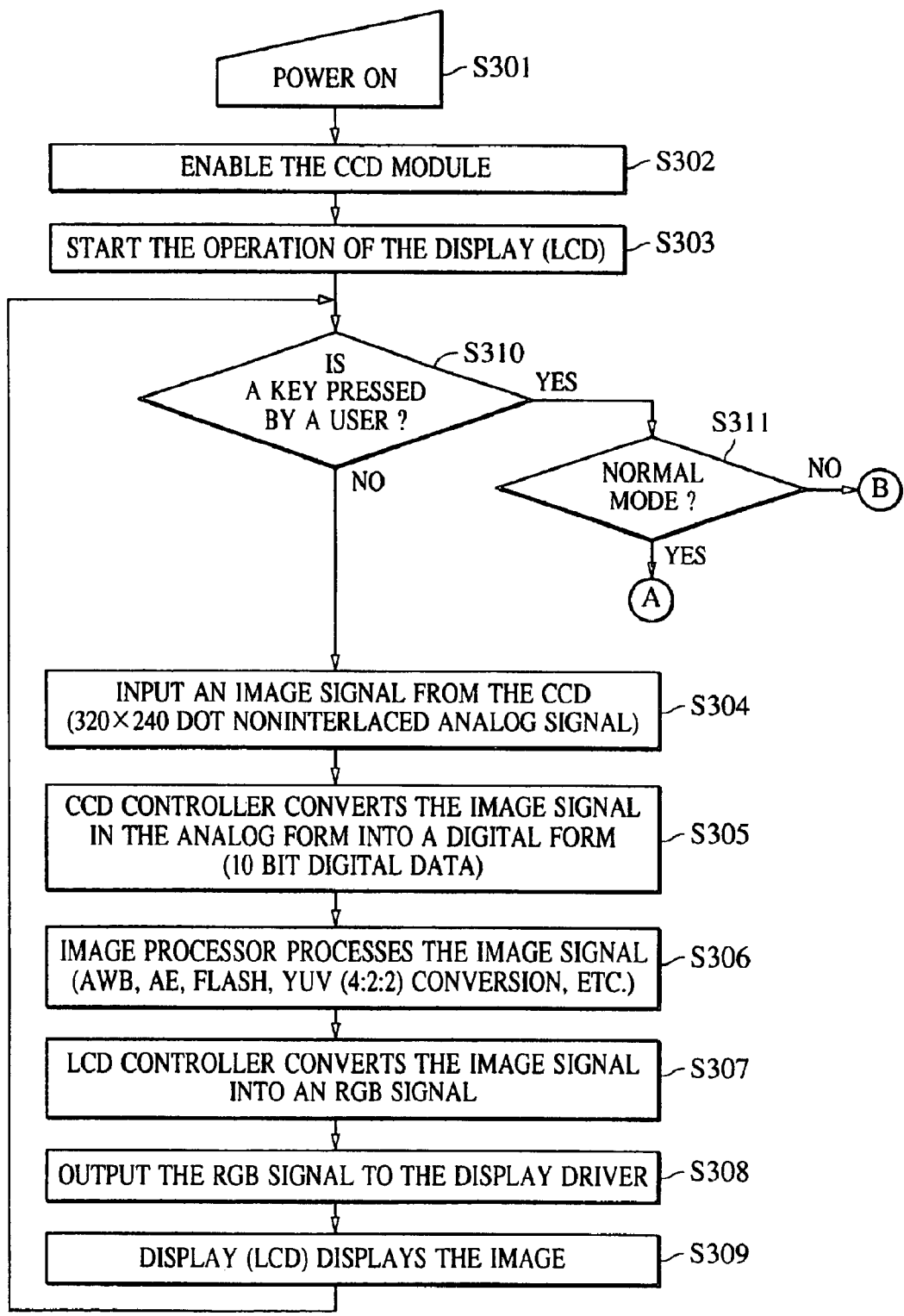
FIG. 3 is a flowchart illustrating a process performed in the digital camera to take an image.

FIG. 3 is a flowchart illustrating the operation of the viewfinder of the digital camera 1 in an image recording mode.

If a user sets the selection switch 9 into the image recording mode (REC) in step S301, the CCD module including the CCD 206 and the CCD controller 207 is enabled in step S302. Then in step S303, the display unit 213, serving as an electronic viewfinder for monitoring a subject image to be recorded, starts to operate.

In step S310, it is determined whether some key is pressed by the user. In step S311, it is determined whether the operation mode of the digital camera 1 is in the normal mode or the half-pressed mode. Then in step S304, the CCD 206 converts optical information obtained via the lens set 205 into an electric signal. The resultant signal is output in the form of a noninterlaced analog signal. To increase the operating speed, the signal or image data is output after performing a resolution reduction according to a known technique from 640 dots×480 dots to 320 dots×to 240 dots.

The signal obtained in step S304 is then subjected, in the following step S305, to a noise reduction process and a gain controlling process in the CCD controller 207. The signal in the analog form is then converted into a 10-bit digital signal and transmitted to the image processor 208. In step S306, the image processor 208 performs various processes including a white balance correction, AE, a correction needed when the image is taken with a strobe, and a signal conversion into the YUV (4: 2: 2) format. The resultant YUV signal is constantly written by the CPU 201 into the VRAM 203c and output to the LCD controller 211.

In step S307, the LCD controller 211 converts the received YUV signal into an RGB digital signal and outputs the resultant RGB signal to the display driver 212 in the following step S308. In step S309, the display unit 213 receives the signal output by the display driver 212 and displays an image according to the received signal.

The process from step S304 to step S311 is performed repeatedly for example every 1/30 sec so that the subject image input from the camera module 215 is displayed on the display unit 213.

If some key, for example the shutter button 214 (8), is pressed by the user when the subject image is displayed, an interrupt event is generated in response to a signal generated by the key operation.

FIG. 4 is a flowchart illustrating a procedure performed in the digital camera 1 when an interrupt occurs during the operation of displaying an image.

At the stage where a key operation is performed by the user, the digital camera 1 is in either of two operation modes: the normal mode in which the viewfinder operation is continuously performed as described above with reference to FIG. 3; or the half-pressed mode which is activated when the user presses the shutter button 214 into the half-pressed position and in which the viewfinder operation is performed while locking the various camera settings. With reference to FIG. 4, the process in the normal mode is first described and then the process in the half-pressed mode is described.

In the normal mode, step S401 performs a key status reading process to determine which key is operated when a key operation is performed by the user. If it is detected in step S402 that the shutter button 214 is pressed, then in step S403 current settings associated with the automatic white balance, AE, and the strobe correction, which are controlled by the image processor 208, are locked. Then in the following step S416, the operations of the display driver 212 and the display unit 213 are stopped to reduce the processing load on the CPU.

In step S417, image data corresponding to the taken image is input. The image processor 208 performs various processes including white balance correction on the input image data. The image data output by the image processor 208 is stored by the CPU 201 into the image storage area 203a of the RAM 203. In step S418, an image compression process according to the JPEG standard is performed on the image data stored in the image storage area 203a. Then in step S419, the compressed image data is stored into the data storage unit 204.

After that, in step S420, the display driver 212 and the display unit 213 in a pausing state are restarted. In step S421, the taken image is displayed on the display unit 213 for a predetermined period of time. Then in step S422, the interrupt process is completed and the process returns to step S304 in FIG. 3 to restart the viewfinder operation. On the other hand, in the key status reading process in step S401, if the CPU 201 detects (in step S404) that the shutter button 214 is pressed by the user into the half-pressed position, then the CPU 201 sets, in step S405, the operation mode of the digital camera 1 into the half-pressed mode. Then in step S406, as in step S403, current settings associated with the automatic white balance, AE, and the strobe correction (which are controlled by the image processor 208) are locked.

In step S407, the interrupt process is completed and the process returns to step S304 in FIG. 3 to restart the viewfinder operation. In the case where it is detected in step S408 that a key is pressed by the user to change an image taking condition, then the process goes to step S409 in which the settings associated with the automatic white balance control, AE, the strobe correction, which are controlled by the image processor 208, are modified depending on the key operation performed by the user. Then in step S407, the process returns to step S304 in FIG. 3 to continue the operation of displaying the image.

In the case where the switch 9 of the digital camera 1 is switched by the user into the "OFF" position in step S410, the operation of displaying the subject image on the display unit is terminated (in step S411) and the operation of the CCD module including the CCD 226 and the CCD controller is also terminated (step in S412). After terminating the other operations associated with the image taking process in step S413, the electric power supply of the digital camera 1 is turned off. In the case where in step S410 the user does not set the selection switch 9 of the digital camera 1 into the "OFF" position, the process goes to step S407 in FIG. 3 to continue the image displaying process.

If an interrupt occurs when the digital camera 1 is in the half-pressed mode, the following procedure is performed.

In the half-pressed mode, step S414 performs a key status reading process to determine which key is operated when a key operation is performed by the user. If it is detected in step S415 that the shutter button 214 is pressed by the user, the information of various settings of the digital camera 1 set in step S406 is made effective, and the process goes to step S416. If, in step S423, the user releases the shutter button 214 of the digital camera 1 from the half-pressed position, then the process goes to step S424 to change the operation mode of the digital camera 1 from the half-pressed mode to the normal mode. The process then goes to step S422.

FIG. 5 is a flowchart illustrating a process of reproducing an image stored in the digital camera 1.

If the user sets the selection switch 9 into a reproducing mode (PLAY) in step S501, then in step S502 the operations of the display driver 212 and the display unit 213 are started. In the following step S503, the CPU 201 reads the compressed image data stored in the data storage unit 204 and temporarily stores it in the image storage area 203a of the RAM 203. Then in step S503, the CPU 201 decompresses the compressed image data.

In step S505, the decompressed image data is stored in the VRAM 203c. In step S506, the YUV signal represented by the image data stored in the VRAM 203c is converted to an RGB digital signal. The resultant RGB signal is output to the display driver 212 in step S507. In step S508, the display unit 213 receives the signal output by the display driver 212 and displays an image according to the received signal.

The digital camera 1 has the capability of storing a plurality of image data together with information representing links among them and reproducing linked image data as described below. The method of linking image data will be described later.

FIG. 6 is a schematic diagram illustrating an example of an image displayed on the display unit 5 of the digital camera 1.

When the digital camera 1 is set in the reproducing (PLAY) mode, if the mode key 6a is pressed, a "genre menu" is displayed. The genre menu includes a plurality of icons representing preset genres. If there a large number of icons which cannot be displayed on a single page, the icons may be displayed across a plurality of pages so that the user can select a genre by switching the menu page.

Figure 6A:
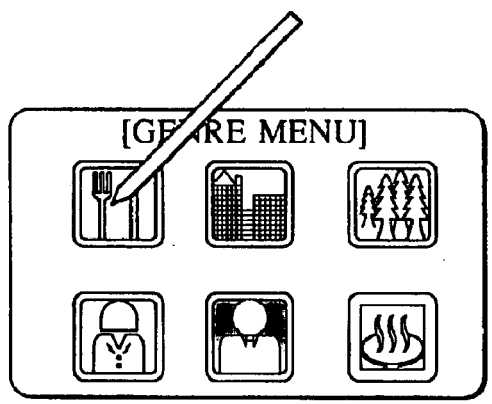
FIG. 6 is a schematic diagram illustrating an example of a displayed image taken by the digital camera 1.
Figure 6B:
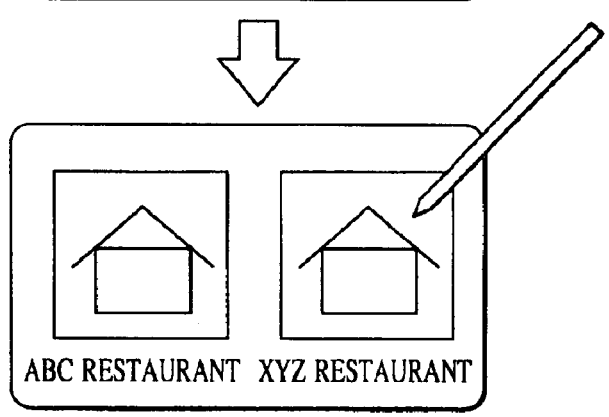
Figure 6C:
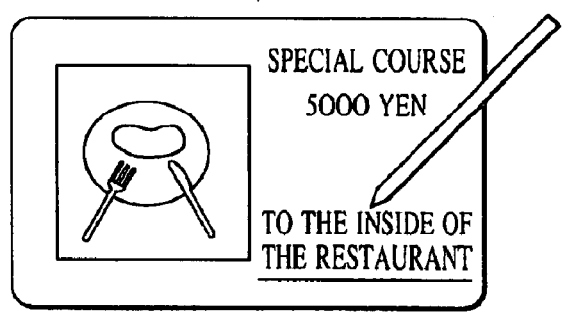
Figure 6D:
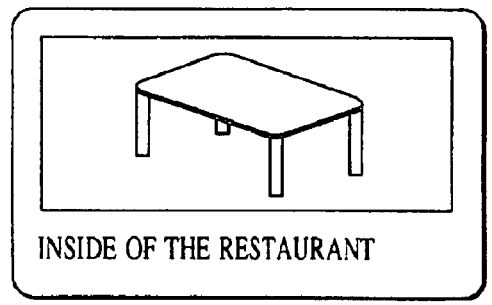

If an icon indicating restaurant information is pressed with a pen 7 (FIG. 6A), an image representing subgenres of restaurant information is displayed on the display unit 213 (5) (FIG. 6B). If a desired subgenre image is pressed with the pen 7, then an image linked to the pressed image is displayed on the display unit 213 (5) (FIG. 6C). In addition to image data, text data may also be displayed as shown in FIG. 6C. For example, if a string "INSIDE OF THE RESTAURANT" is pressed with the pen 7, then image data linked to this string is read from the data storage unit 204 of the digital camera and displayed as shown in FIG. 6D.

Figure 7:
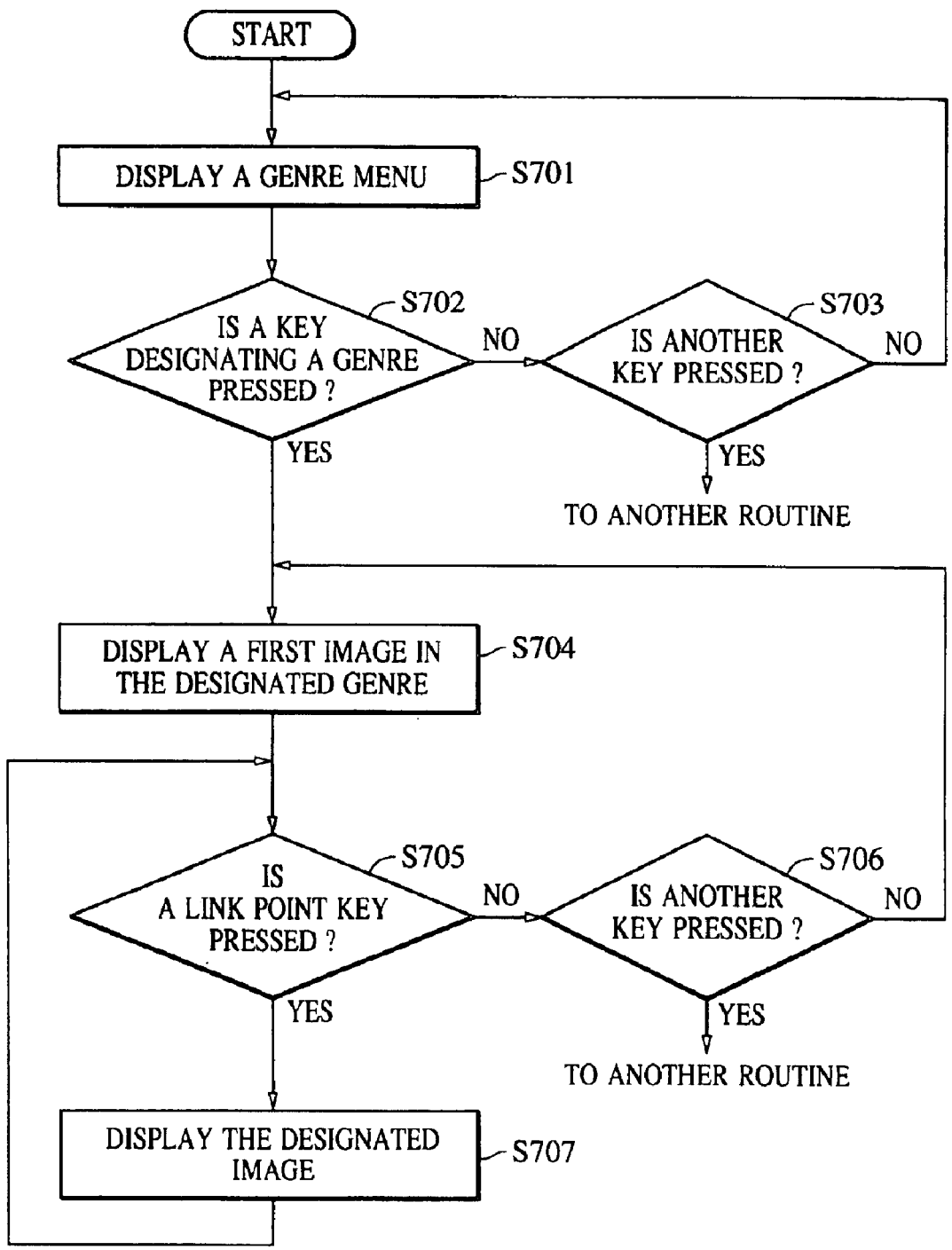
FIG. 7 is a flowchart illustrating the process of displaying the image shown in FIG. 6.

FIG. 7 is a flowchart illustrating the displaying process described above with reference to FIG. 6.

In step S701, the genre menu is displayed on the display unit 213 (5) so that the use can select a desired genre from the genre menu. In step S702, it is determined whether the user has selected an icon indicating a particular genre from the icons displayed on the genre menu. In the case where no genre icon is selected by the user, the process goes to step S703 to determine whether another key operation has been performed by the user. If it is determined that the user has performed another key operation, a process corresponding to the operated key is performed. If it is determined that no key operation has been performed by the user, the process returns to step S701.

In step S702, if an icon indicating a particular genre, for example the icon indicating restaurants shown in FIG. 6A, is selected by the user, then in the next step S704 image data linked to the selected genre is read from the data storage unit 204 and displayed on the display unit 213 (5). If there are a plurality of image data linked to the selected genre, image data stored for example at the first storage location may be displayed.

In the next step S705, if the image displayed on the display unit 213 (5) includes a link point (string "INSIDE OF THE RESTAURANT" in the specific example shown in FIG. 6C), it is determined whether the link point is selected by the user with the pen 7 or the like. If the link point is not selected by the user, the process goes to step S706 and determines whether a key operation has been performed by the user. If it is determined that the user has performed a key operation, a process corresponding to the operated key is performed. If it is determined that no key operation has been performed by the user, the process returns to step S704. In the case where in step S705 the user has selected a link point, the process goes to step S707.

Link points may have a character string with an underline or a character string with a particular color so that the user can recognize that the link points have linked image data.

In step S707, image data linked to the link point is read from the data storage unit 204 and displayed on the display unit 213 (5) as shown in FIG. 6D. If the image of the image data read and displayed on the display unit 213 (5) in step S707 includes another link point, then in step S705 the process goes into a waiting state and stays there until the user presses the link point. In this way, image data linked to link points may be displayed one by one on the display unit 213 (5).

A method of linking an image taken with the digital camera 1 is described below. First, a conventionally employed method is described with reference to FIGS. 8 and 9, and then a method according to an embodiment of the present invention is described with reference to FIGS. 10–13 so as to make differences clear.

FIG. 8 is a schematic diagram illustrating an example of an image displayed on the display unit 5 of the digital camera 1.

FIG. 8 illustrates an example of a process of linking image data to an arbitrary point of a map displayed on the display unit 213 (5).

Figures 8A, 8B, 8C, 8D:
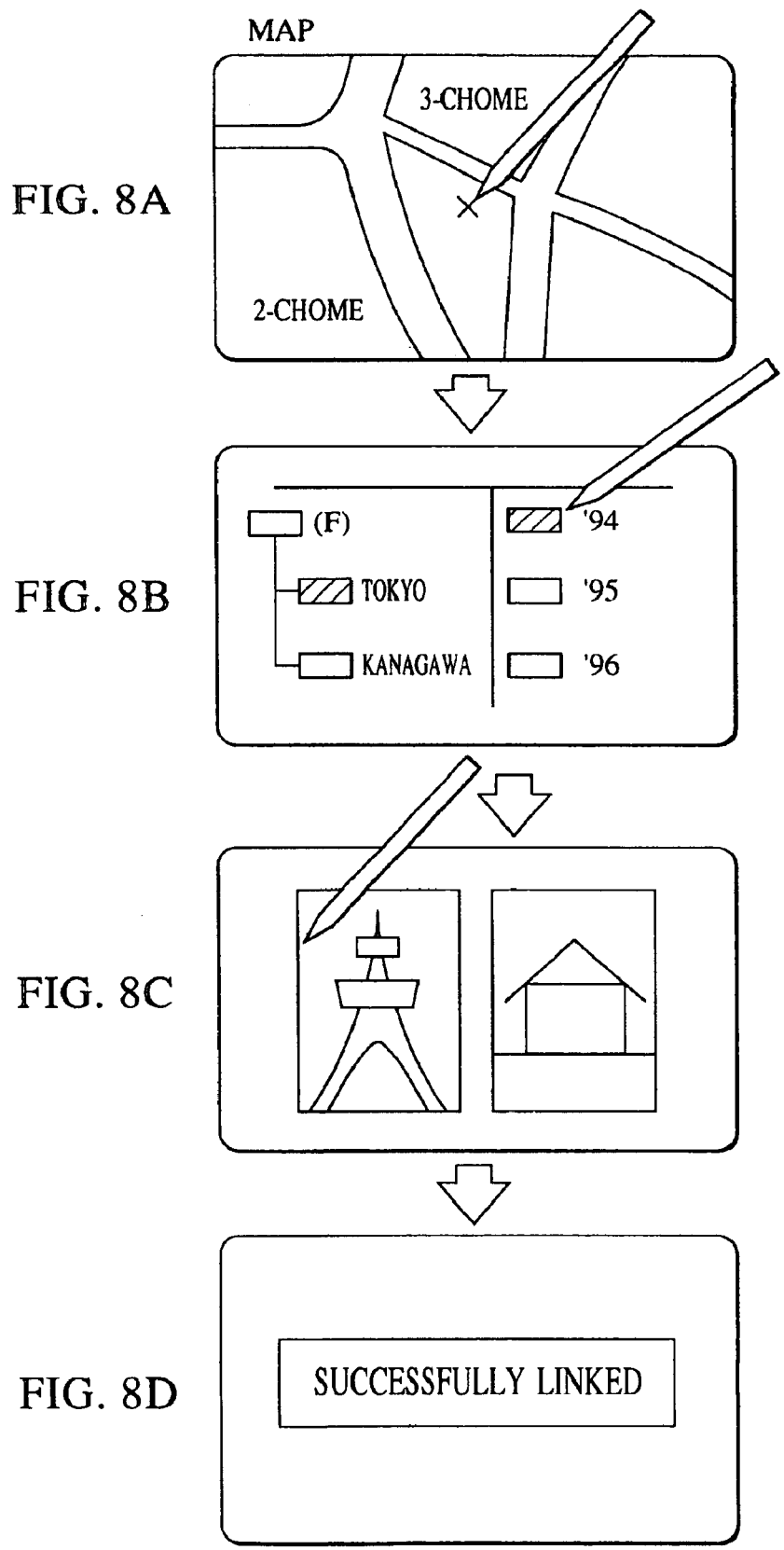
FIG. 8 is a schematic diagram illustrating a process of establishing links among images taken by a digital camera according to a conventional technique.

As shown in FIG. 8A, the user reads image data representing the map from the data storage unit 204 and displays it on the display unit 213 (5). The map image data may be generated by taking an image of an actual map with the digital camera 1, or may be obtained by downloading map data into the digital camera 1 from a networked external device 217 such as a server via the interface 216.

After displaying the map on the display unit 213 (5), if an arbitrary point on the map is pressed with the pen 7, then a link point is assigned there. If a link point is assigned, a data file structure stored in the data storage unit 204 is displayed as shown in FIG. 8B. The user may open folders one by one until he/she finds, from data files, a desired image to be linked to the link point.

When desired image data is found, if the image data is designated with the pen 7 as shown in FIG. 8C, then the image data is selected as image data to be linked to the link point, and information representing the link between the data representing the map and the selected image data is stored into the data storage unit 204. A message telling that the linking process has been completed is displayed on the display unit 213 (5) as shown in FIG. 8D.

Figure 9:
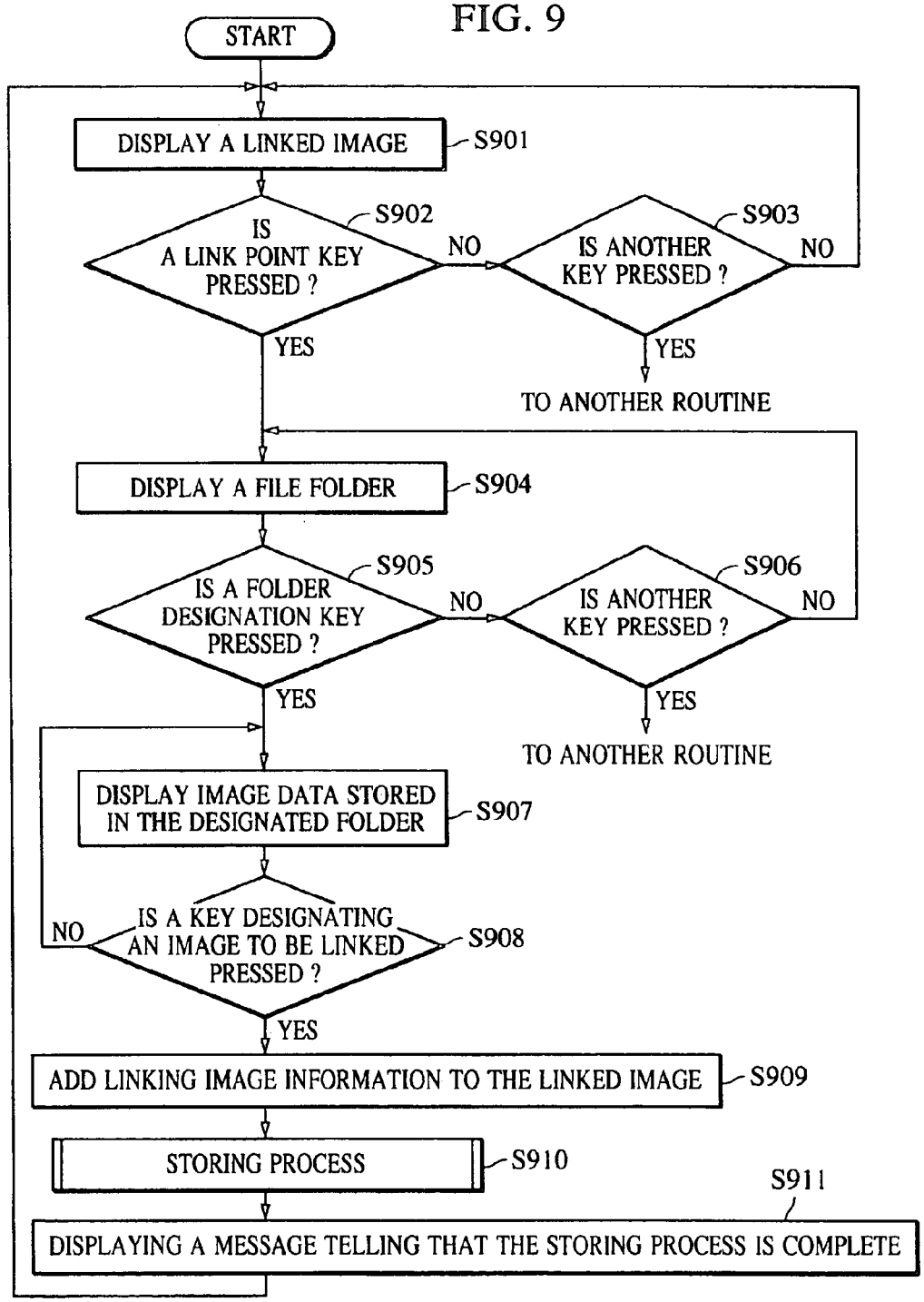
FIG. 9 is a flowchart illustrating a process of establishing links among the images shown in FIG. 8.

FIG. 9 is a flowchart illustrating the linking process described above with reference to FIG. 8.

In step S901, data to which image data is to be linked is read from the data storage unit 204 and displayed on the display unit 213 (5). In step S902, it is determined whether an arbitrary point (link point) of the displayed image is designated by the user with the pen 7. If no link point is designated by the user, the process goes to step S903 and determines whether another key operation has been performed by the user. If it is determined that the user has performed another key operation, a process corresponding to the operated key is performed. If it is determined that no key operation has been performed by the user, the process returns to step S901. In the case where in step S902 the user has selected a link point, the process goes to step S904.

In step S904, file folders are displayed on the display unit 213 (5) so that the user may select an image to be linked to the link point. In step S905, it is determined whether any folder is designated by the user with the pen 7. If no folder is designated by the user, the process goes to step S906 and determines whether another key operation has been performed by the user. If it is determined that the user has performed another key operation, a process corresponding to the operated key is performed. If it is determined that no key operation has been performed by the user, the process returns to step S904. On the other hand, in the case where some folder is designated in step S905, the process goes to step S907.

In step S907, image data stored in the designated folder are read successively from the data storage unit 204 and displayed on the display unit 213 (5). In step S908, if the displayed thumbnail images include desired image data, the user designates the desired image data by pressing it with the pen 7. If some image data is designated, then in step S909, additional information such as the file name of the image data designated by the user is added to the data to which the image data is linked and stored in the following step S910. In step S911, a message telling that the linking and storing processes are complete is displayed on the display unit 213 (5) and the process returns to step S901.

In the widely employed method described above, to link an image displayed on the display unit 213 (5) to another image (or text data), image data of a taken image is first temporarily stored into a particular folder and then image data to which the taken image is to be linked is read from stored image data. After that, the taken image data to be linked to the data is read again. Thus a very troublesome process is required to link image data. Furthermore, when image data to be linked is selected, because the data selection is performed on the basis of file names, there is a possibility that undesired image data is linked by mistake.

In the method according to the present invention, to avoid the above problem, link points may be assigned in advance to data displayed on the display unit 213 (5). When an image is taken after that, the taken image may be linked to a desired linked point of the data. This method makes it easy for the user to establish a link without making an incorrect link. This method according to the present invention is described in further detail below.

Figure 10A:
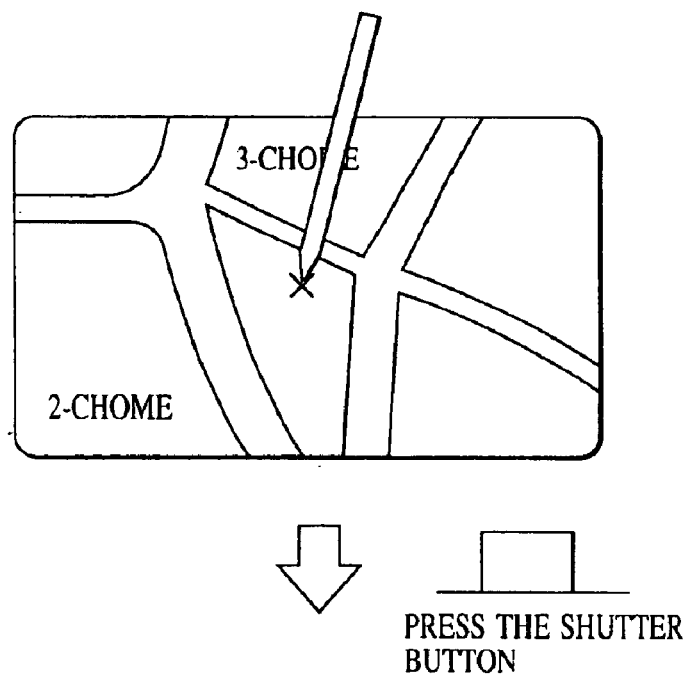
FIG. 10 is a schematic diagram illustrating a process of establishing links among images taken by a digital camera according to an embodiment of the present invention.
Figure 10B:
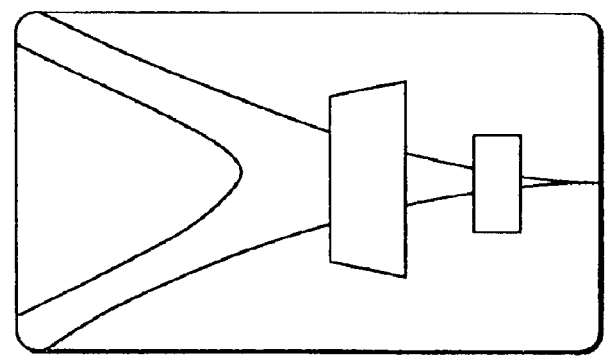
Figure 10C:
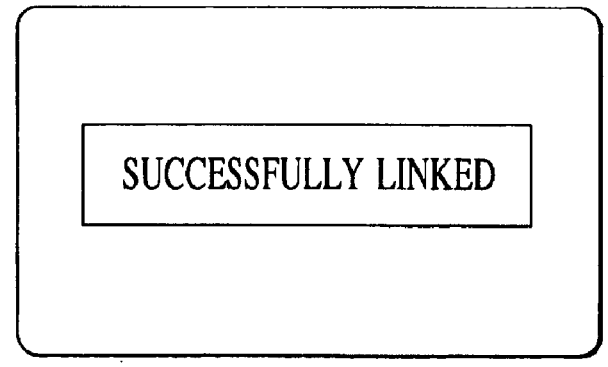

FIG. 10 is a schematic diagram illustrating an example of an image displayed on the display unit 5 of the digital camera 1.

With reference to FIG. 10, an example of a process of linking associated image data to an arbitrary point of a map displayed on the display unit 213 (5) is described below.

As shown in FIG. 10A, the user reads image data representing the map from the data storage unit 204 and displays it on the display unit 213 (5). The map image data may be generated by taking an image of an actual map with the digital camera 1. Alternatively, the map image data may be obtained by downloading map data into the digital camera 1 from an external device 217 such as a server connected to a network such as the Internet via communication means provided in the digital camera 1.

After displaying the map on the display unit 213 (5), if an arbitrary point on the map is touched with the pen 7, a mark such as "X" indicating a link point is added (at the point designated by the user) to the map. After that, if the digital camera 1 is set so that the lens 4 is aimed at a subject and the shutter button 8 is pressed, then an image of the subject is displayed on the display unit 213 (5) as shown in FIG. 10B. At substantially the same time, information representing the link between the taken image data and the link point of the image data (the map shown in FIG. 10A, in this specific example) to which the taken image data is to be linked is added as link information and stored in the data storage unit 204. A message is then displayed, as shown in FIG. 10, on the display unit 213 (5) to tell the user that the taken image data has been successfully linked to the desired data.

Figure 14:
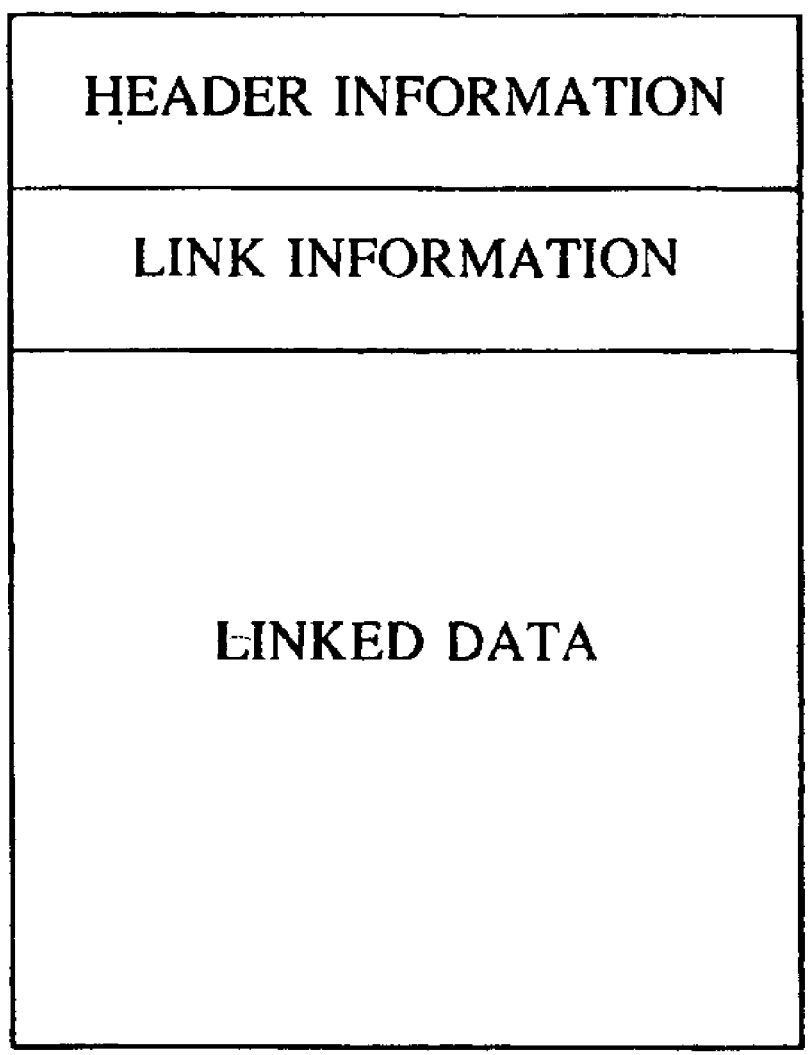
FIG. 14 illustrates an example of a data structure of data to which another image data is linked and which includes added link information.

FIG. 14 illustrates an example of a data structure of data to which the taken image is linked and which includes added link information. In FIG. 14, in the case where the image is compressed for example according to the JPEG standard, the header information includes information representing the compression ratio. The link information includes information about link points and also includes information representing the linking relationship between link points and taken image data. The data is for example map data to which the taken image data is linked.

Figure 11:
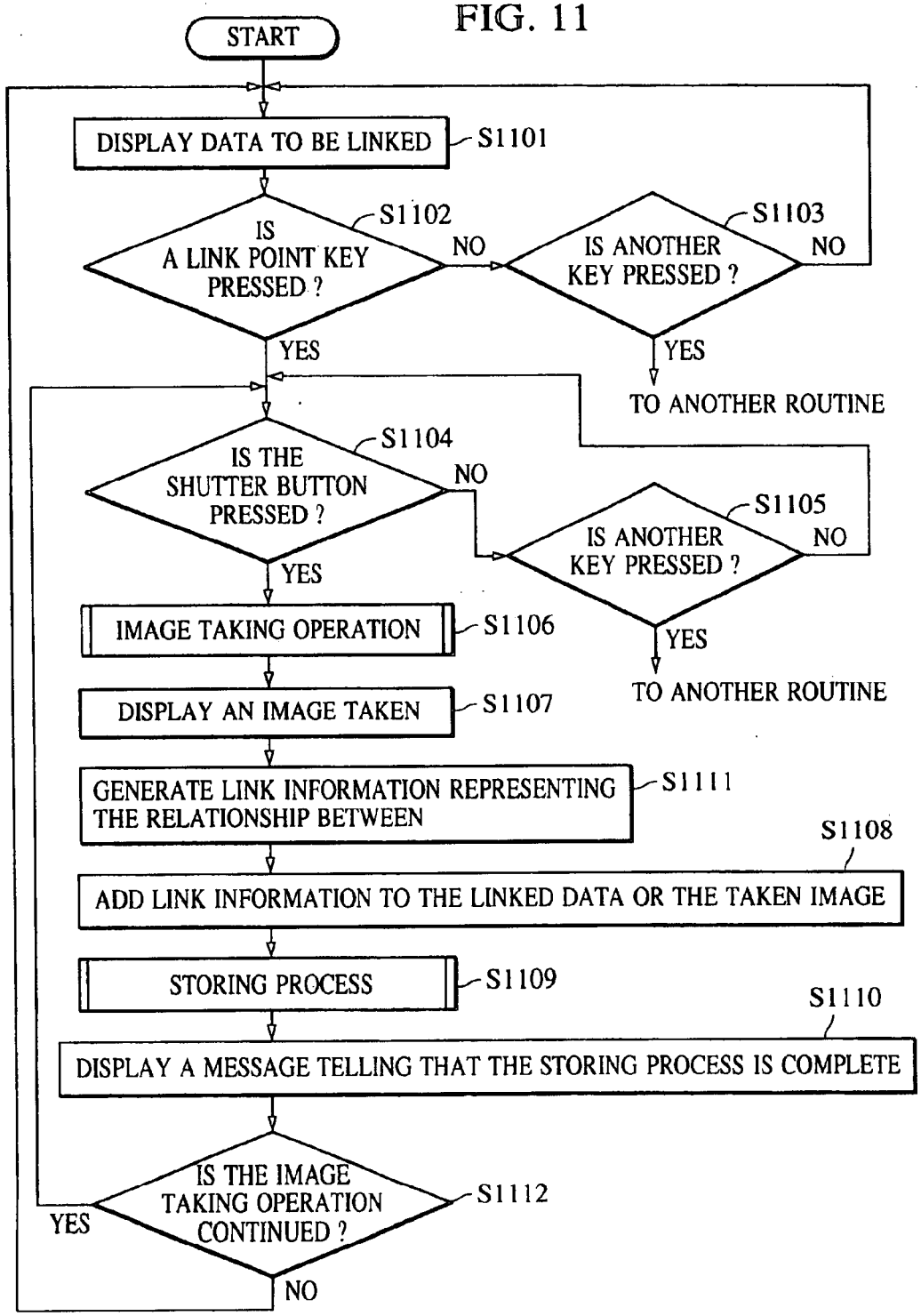
FIG. 11 is a flowchart illustrating a process of establishing links among the images shown in FIG. 10.

FIG. 11 is a flowchart illustrating the linking process described above with reference to FIG. 10.

In step S1101, data such as map data to which image data is to be linked is read from the data storage unit 204 and displayed on the display unit 213 (5).

In step S1102, it is determined whether an arbitrary point (link point) of the displayed image such as a map is designated by the user with the pen 7. If no link point is designated by the user, the process goes to step S1103 and determines whether another key operation has been performed by the user. If it is determined that the user has performed another key operation, a process corresponding to the operated key is performed. If it is determined that no key operation has been performed by the user, the process returns to step S1101. In the case where in step S1102 the user has selected a link point, the process goes to step S1104.

In step S1104, it is determined whether the shutter button 214 (8) is pressed by the user. If the shutter button 214 (8) is not pressed by the user, the process goes to step S1105 and determines whether another key operation has been performed by the user. If it is determined that the user has performed a key operation, a process corresponding to the operated key is performed. If it is determined that no key operation has been performed by the user, the process returns to step S1104. In the case where it is determined in step S1104 that the shutter button 214 (8) is pressed by the user, the process goes to step S1106.

In step S1106, an image of a subject is taken and the resultant image data is stored in accordance with the procedure shown in FIGS. 3 and 4. In step S1107, the taken image (image data to be linked) is displayed on the display unit 213 (5). In step S1111, link information is generated which represents the linking relationship between an arbitrary point (link point) designated by the user and the image data (linked image data) which has been taken after the user designated the link point. That is, the link information is generated so as to represent the linking relationship between data such as map data and image data linked to the former data. Any taken image data is linked to the same link point that has been designated last unless a new link point is designated by the user. This makes it unnecessary for the user to designate a link point whenever an image to be linked to the same link point is taken. The link information includes, for example, point information indicating an arbitrary point designated by the user, identification information (such as a file name) of linked image data, and identification information (such as a file name) of data to which the image data is linked.

In step S1108, the link information is added to data such as map data to which the taken image is linked. The link information may be added also to the image linked to the map data. The data to which the image data is linked and the link information is added may be represented into the HTML (Hyper Text Markup Language) file format. In this case, a particular string or a mark may be displayed in a superimposed fashion on the map or similar image represented by the data to which the image data is linked so that when the displayed string or the mark is designated by the user, the linked image data corresponding to the designated string or the mark is read from the data storage unit 204 and displayed on the display unit 213 (5).

In step S1109, the image data of the taken image and the data to which the taken image data is linked and which includes the added link information are stored in the data storage unit 204. In step S1110, a message is displayed on the display unit 213 (5) to tell the user that the linking and storing processes are complete and the process goes to step S1112. If it is desired to link another taken image to the same link point, the process goes to step S1104. However, if it is desired to change the link point or finish the image taking operation, the process returns to step S1101. When the image pickup apparatus is in the image reproducing mode, if a point having linking information on the data (map) to which an image is linked to is designated, then the CPU 201 displays the linked image indicated by the link information. This reproducing process is also performed in a similar manner in other embodiments which will be described later.

In the present invention, as described above, data such as map data to which an image is to be linked is displayed on the display unit 213 (5) and a link point is assigned to the data (map data) in advance before taking an image. When an image is taken after that, the taken image can be easily linked to the data (map data). Thus, it is possible to easily link a taken image to another image data. Furthermore, unlike the convention technique, it is possible to prevent an undesired image from being linked to another image data by mistake.

Figure 13B:
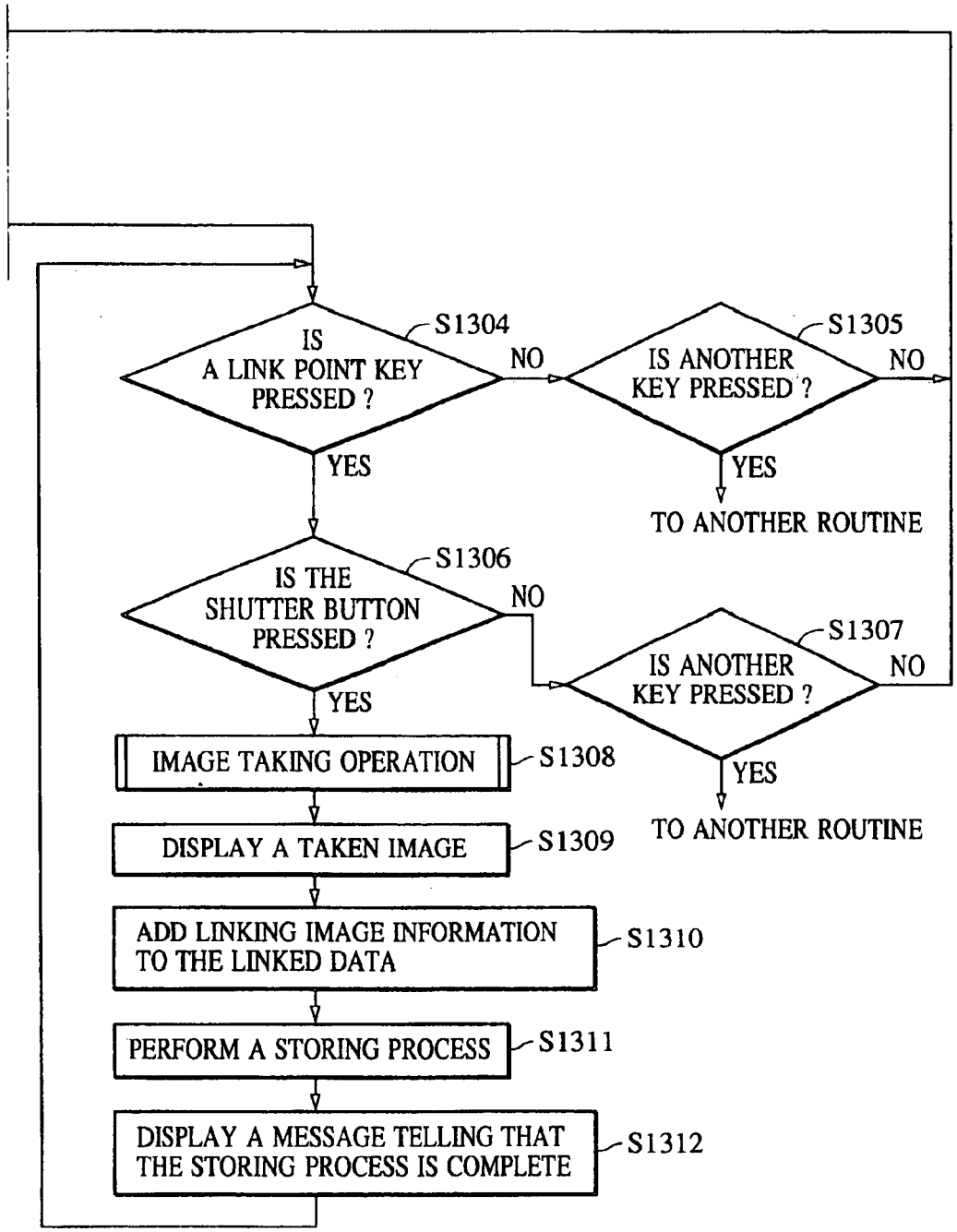
FIG. 13 is a flowchart illustrating a process of establishing links among the images shown in FIG. 12.

Referring now to FIGS. 12 and 13, other embodiments according to the present invention are described below. The construction of the digital camera 1 employed in the following embodiments are similar to that employed in the first embodiment, and thus no further description is given herein.

In the embodiments described below, a desired image is automatically taken and stored simply by designating a link point assigned to particular data without needing the user's operation of pressing the shutter button 214 (8).

FIG. 12 is a schematic diagram illustrating an example of an image displayed on the display unit 5 of the digital camera 1.

With reference to FIG. 12, an example of a process of linking associated image data to an arbitrary point of a map displayed on the display unit 213 (5) is described below.

As shown in FIG. 12A, the user selects image data representing a map from image data stored in a folder or the like. The selected image data is read from the data storage unit 204 and displayed on the display unit 213 (5). An image of a subject input through the lens 4 is also displayed in a partial area of the display unit 213 (5). The area in which the subject image is displayed may be moved to an arbitrary location on the screen of the display unit 213 (5). Furthermore, it is possible to arbitrarily set the size of the area.

If the user designates an arbitrary point on the map with the pen 7 as shown in FIG. 12B while monitoring the subject image displayed in the partial area, then the image data is automatically taken and stored as described above. At substantially the same time, link information is generated which represents that the taken image (linked image data) is linked to the particular point (link point) designated by the user. The generated link information is added to the data to which the image is linked and stored in the data storage unit 204. A message is then displayed, as shown in FIG. 12C, on the display unit 213 (5) to tell the user that the taken image data has been successfully linked to the desired data.

FIG. 13 is a flowchart illustrating the linking process described above with reference to FIG. 12.

The process from step S1304 to step S1312 is similar to the process from step S1102 to S1110 shown in FIG. 11, and thus no further description is given herein.

In step S1301, data such as map data to which image data is to be linked is read from the data storage unit 204 and displayed on the display unit 213 (5). In step S1302, it is determined whether a direct mode is selected. When the direct mode is selected, if the user designates a link point assigned to the data displayed on the display unit 213 (5) with the pen 7, then the operation of taking and storing a subject image is immediately started. However, if the direct mode is not selected, the operation of taking and storing a subject image is started when the shutter button 214 (8) is pressed after a link point assigned to the data displayed on the display unit 213 (5) is designated by the user with the pen 7.

In step S1303, it is determined whether another key operation has been performed by the user. If it is determined that the user has performed another key operation, a process corresponding to the operated key is performed. However, if it is determined that no key operation has been performed by the user, the process returns to step S1304. In the case where it is determined in step S1302 that the direct mode is selected, the process goes to step S1313 and the process shown in FIG. 3 is performed. In step S1314, the subject image obtained through the lens 4 and the CCD 206 is displayed on the display unit 213 (5) in such a manner the subject image is superimposed on the image data to which the subject image is to be linked.

In step S1315, it is determined whether an arbitrary point (link point) of the image data displayed on the display unit 213 (5) is designated by the user with the pen 7. If no link point is designated by the user, the process goes to step S1316 and determines whether another key operation has been performed by the user. If it is determined that the user has performed another key operation, a process corresponding to the operated key is performed. However, if it is determined that no key operation has been performed by the user, the process returns to step S1315. In the case where it is determined in step S1315 that a link point is selected by the user, the process goes to step S1317.

In step S1317, the process of taking and storing the image data is performed according to the procedure shown in FIG. 4. In step S1321, link information is generated which represents that the taken image is linked to the image data displayed on the display unit 213 (5). Then in step S1318, the link information associated with the taken image is added to the image data to which the taken image is linked. In step S1319, the image data of the taken image and the data to which the taken image is linked to and which includes the added link information are stored in the data storage unit 204. In step S1320, a message is displayed on the display unit 213 (5) to tell the user that the linking and storing processes are complete and the process returns to step S1301.

The present embodiments may be applied to various types of systems which may include either a plurality of devices (such as a host computer, interfaces, reader, printer, etc.) or a single device (such as a copying machine or a facsimile machine).

Furthermore, the objects of the present embodiments may also be achieved by supplying a storage medium, on which a software program implementing the functions of any of the embodiments described above is stored, to a system or an apparatus whereby a computer (CPU or MPU) in the system or apparatus reads and executes the program code stored on the storage medium.

In this case, it should be understood that the program code read from the storage medium implements the functions of the embodiments and thus the storage medium storing the program code falls within the scope of present invention.

Storage media which can be preferably employed in the present invention to supply the program code include a floppy disk, hard disk, optical disk, magneto-optical disk, CD-ROM, CD-R, magnetic tape, non-volatile memory card, and ROM.

Furthermore, the scope of the present embodiments includes not only such a system in which the functions of any embodiment described above is implemented simply by reading and executing a program code on a computer but also a system in which a part of or the whole of process instructed by the program code is performed using an OS (operating system) on the computer.

Furthermore, the scope of the present embodiments also includes a system in which a program code is transferred once from a storage medium into a memory provided in a function extension board inserted in a computer or provided in a function extension unit connected to the computer, and then a part of or the whole of process instructed by the program code is performed by a CPU or the like in the function extension board or the function extension unit thereby implementing the functions of any embodiment described above.

As described above, the present embodiments provide an image pickup apparatus having the capability of easily linking a stored image to another stored image. The invention also provides a method of controlling such an image pickup apparatus and a storage medium storing a program according to which the image pickup apparatus is controlled.

The individual components shown in outline or designed by blocks in the drawings are all well-known in the image taking arts, and there specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:
    an image sensor;
    a storage unit which stores predetermined data;
    a display unit which displays the predetermined data stored in said storage unit;
    a designation unit which a user operates to manipulate a display on said display unit so as to designate an arbitrary point on the predetermined data displayed on said display unit; and
    a control unit communicatively coupled to said storage unit and said designation unit,
    wherein said control unit controls the start of an image taking operation to take an image in response to designation of the arbitrary point by said designation unit, and the generation of link information linking the image taken in the image-taking operation to the arbitrary point designated by said designation unit.

2. An image pickup apparatus according to claim 1, further comprising an addition unit that adds the link information generated by said control unit to the predetermined data or the image taken in the image-taking operation.

3. An image pickup apparatus according to claim 1, wherein said storage unit further stores the image taken in the image-taking operation.

4. An image pickup apparatus according to claim 1, wherein said control unit generates link information such that an image taken in an image-taking operation is linked to the same arbitrary point as an image taken in an immediately previous image-taking operation unless another arbitrary point is designated by said designation unit.

5. An image pickup apparatus according to claim 1, wherein the predetermined data is data representing a map.

6. An image pickup apparatus according to claim 3, wherein images may be stored in said storage unit in a hierarchical fashion according to the link information and/or such that the images are linked to each other.

7. An image pickup apparatus according to claim 1, further comprising a display control unit that controls a display process such that, when said image pickup apparatus is in an image reproducing mode, if a point having link information or a particular area adjacent to the point on the predetermined data is designated by said designation unit, then an image indicated by the link information as an image corresponding to the designated point is displayed.

8. An image pickup apparatus according to claim 1, wherein the predetermined data stored in said storage unit is an image taken by said image sensor or an image input from an external device.

9. An image pickup apparatus according to claim 1, wherein the link information generated by said control unit includes information indicating the arbitrary point designated by said designation unit and also includes identification information of an image taken by said image sensor.

10. A method of controlling an image pickup apparatus, comprising:
    a displaying step of displaying predetermined data stored in a storage unit;
    a designation step of designating an arbitrary point in the predetermined data displayed in said display step in response to user operation of a designation unit of the image pickup apparatus manipulating a display of the predetermined data in said display step;
    an image taking step of starting an image taking operation to take an image in response to the designation of the arbitrary point in said designation step; and
    a generation step of generating link information to link the image taken in the image taking operation of said image taking step to the arbitrary point designated in said designation step.

11. A method according to claim 10, further comprising an addition step of adding the link information generated in said generation step to the predetermined data or the image taken in the image-taking operation of said image taking step.

12. A method according to claim 10, wherein said generation step includes generating link information such that the image taken in the image-taking operation of said image taking step is linked to the same arbitrary point as an image taken in an immediately previous image-taking operation unless another arbitrary point is designated in said designation step.

13. A method according to claim 10, wherein the predetermined data is data representing a map.

14. A method according to claim 10, further comprising a display controlling step of controlling a display process such that, when the image pickup apparatus is in an image reproducing mode, if a point having link information or a particular area adjacent to the point in the predetermined data is designated in said designation step, then an image indicated by the link information as an image corresponding to the point designated in said designation step is displayed.

15. A method according to claim 10, wherein the predetermined data is the image taken in the image-taking operation of the image taking step or an image input from an external device.

16. A method according to claim 10, wherein the link information generated in said generation step includes information indicating the arbitrary point designated in said designation step and also includes identification information of the image taken in the image-taking operation of said image taking step.

17. A storage medium storing a program for executing the method of controlling an image pickup apparatus according to claim 10.

18. A storage medium storing a program for executing the method of controlling an image pickup apparatus according to claim 12.

19. A storage medium storing a program for executing the method of controlling an image pickup apparatus according to claim 14.

* * * * *

UNITED STATES PATENT AND TRADEMARK OFFICE
CERTIFICATE OF CORRECTION

PATENT NO. : 6,903,773 B1
DATED : June 7, 2005
INVENTOR(S) : Hideo Fushimoto

It is certified that error appears in the above-identified patent and that said Letters Patent is hereby corrected as shown below:

Column 7,
Line 20, "use" should read -- user --.

Column 13,
Line 6, "is" should read -- are --.

Signed and Sealed this

Eighteenth Day of April, 2006

JON W. DUDAS
*Director of the United States Patent and Trademark Office*